(12) United States Patent  
Reese

(10) Patent No.: US 7,869,660 B2
(45) Date of Patent: Jan. 11, 2011

(54) PARALLEL ENTROPY ENCODING OF DEPENDENT IMAGE BLOCKS

(75) Inventor: Robert J. Reese, Corpus Christi, TX (US)

(73) Assignee: Intel Corporation, Santa Clara, CA (US)

( * ) Notice: Subject to any disclaimer, the term of this patent is extended or adjusted under 35 U.S.C. 154(b) by 1162 days.

(21) Appl. No.: 11/263,594

(22) Filed: Oct. 31, 2005

(65) Prior Publication Data

US 2007/0098276 A1 May 3, 2007

(51) Int. Cl.
*G06K 9/36* (2006.01)

(52) U.S. Cl. .................. 382/239; 382/232; 382/235

(58) Field of Classification Search ................. 382/235, 382/239, 232; 704/229, E19.044, 9, 270, 704/200; 375/240.03, E7.14, E7.211, E7.048, 375/E7.065; 714/764, E11.039; 358/453, 358/452; 348/14.12, 14.08, 14.13; 705/2; 707/999.101; 341/106, 107

See application file for complete search history.

(56) References Cited

U.S. PATENT DOCUMENTS

| | | | |
|---|---|---|---|
| 5,710,562 A * | 1/1998 | Gormish et al. ............. 341/107 |
| 6,785,860 B1 * | 8/2004 | Patti ........................... 714/764 |
| 7,383,180 B2 * | 6/2008 | Thumpudi et al. .......... 704/229 |

* cited by examiner

*Primary Examiner*—Anh Hong Do
(74) *Attorney, Agent, or Firm*—Trop, Pruner & Hu, P.C.

(57) ABSTRACT

A method of entropy encoding image or video data may include entropy encoding a number of blocks independently and in parallel to generate a number of bit streams. At least one of the number of bit streams may include an assumed value in place of a value that would be determined by another bit stream. The method may also include selectively correcting the assumed value based on a value in another one of the number of bit streams. The number of bit streams may be combined into an output, entropy encoded bit stream corresponding to the number of blocks.

20 Claims, 4 Drawing Sheets

PARALLEL ENTROPY ENCODING OF DEPENDENT IMAGE BLOCKS

BACKGROUND

Implementations of the claimed invention generally may relate to schemes for encoding image information and, more particularly, to schemes for entropy encoding of image information.

Image entropy encoding, also known as "variable length coding," may compress the data for chunks of an image into a stream of bits using various techniques (e.g., Huffman coding, pre-calculated Huffman-based coding (e.g., transform coefficients, motion vector difference, etc,), exponential Golomb coding, arithmetic coding, context-based arithmetic coding, etc.) to produce the fewest number of bits per chunk. As used herein, a "chunk" of image data may be understood to denote a portion of an image. In some implementations, and for ease of explanation herein, a chunk of an image may be a block (e.g., 4×4 pixels, 4×8 pixels, 8×8 pixels, etc.) of data according to any of a number of image and/or video compression standards (e.g., JPEG, MPEG-1, MPEG-2, MPEG-4, Advanced Video Coding (AVC) (e.g., MPEG-4, part 10 and ITU-T Recommendation H.264), Windows Media Video 9 (WMV-9), SMPTE's VC-1, etc.). In some implementations, a chunk of an image may be a fraction of a block of image data (e.g., ½, ¼, etc.) or a number of blocks of image data (e.g., 2 blocks, 4, blocks, a macroblock, etc.).

As one illustrative example, in H.264-encoded video, the block data may include multiple quantized coefficient levels, a quantization level, block type, and motion vectors. One technique for reducing the bits in encoded chunks or blocks may be to encode data dependently with regard to data in a preceding chunk or block when the data is similar in value. For example if the quantization level is the same value for n blocks, multiple bits may be used for the quantization value for the first block and a single bit that indicates no change may be used for the following blocks.

The data input to entropy coding may typically be represented in multiples of 8 bits, usually 8, 16, or 32 bit values, while the output may typically be a single stream of bits with sequences of bits whose lengths are dependent upon their value. Large values may be represented by relatively many bits while small values require may be represented by relatively few bits.

FIGS. 1A and 1B conceptually illustrate entropy encoding of eight blocks of image data as performed by a single processor. In FIG. 1A, the resulting intermediate results 110-0 through 110-7 (collectively "intermediate results 110") are illustrated for the eight blocks 0 through 7. For each block that is entropy encoded, the processor may determine an appropriate quantization level (e.g., Q=26, 27, etc. out of a 0 to 51 quantization range for H.264). At that quantization level, the processor may also determine, in accordance with the particular entropy encoding scheme, the number of coefficients needed to represent a particular block (e.g., 4 coefficients for block 0; 1 coefficient for block 1; 0 coefficients for block 2, etc.).

It should be noted that the per-block data 110-0 through 110-7 shown in FIG. 1A is temporary, and may be immediately transformed to a stream of bits 120 while a particular block is processed. Intermediate result 110-0, for example, may be overwritten by the processor when the next block is processed to generate intermediate result 110-1. Hence, the results 110 shown in FIG. 1A have a temporal aspect to them, because not all results 110 may be present at the same time.

FIG. 1B illustrates a data stream 120 that the processor constructs from intermediate results 110. The "Skip" value may indicate the number of previous blocks that have no coefficients, and the differential quantization (dQ) value may indicate the change in quantization value from that of the previous block. For the first block, however, dQ may be its quantization value Q. The c0, c1, etc. values may represent the coefficient values for a given block. The processor 120 may generate stream 120 as it generates intermediate results 110, subject to any data dependencies. For example, the processor may not add the data for block 4 to stream 120 until after generating intermediate results 110 for blocks 2, 3, and 4.

Where other encoding steps (e.g., motion estimation) have been optimized, however, such serial entropy encoding by a single processor may consume an unacceptably large amount of the total encoding time.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIGS. 1A and 1B conceptually illustrate entropy encoding performed by a single processor.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 2:
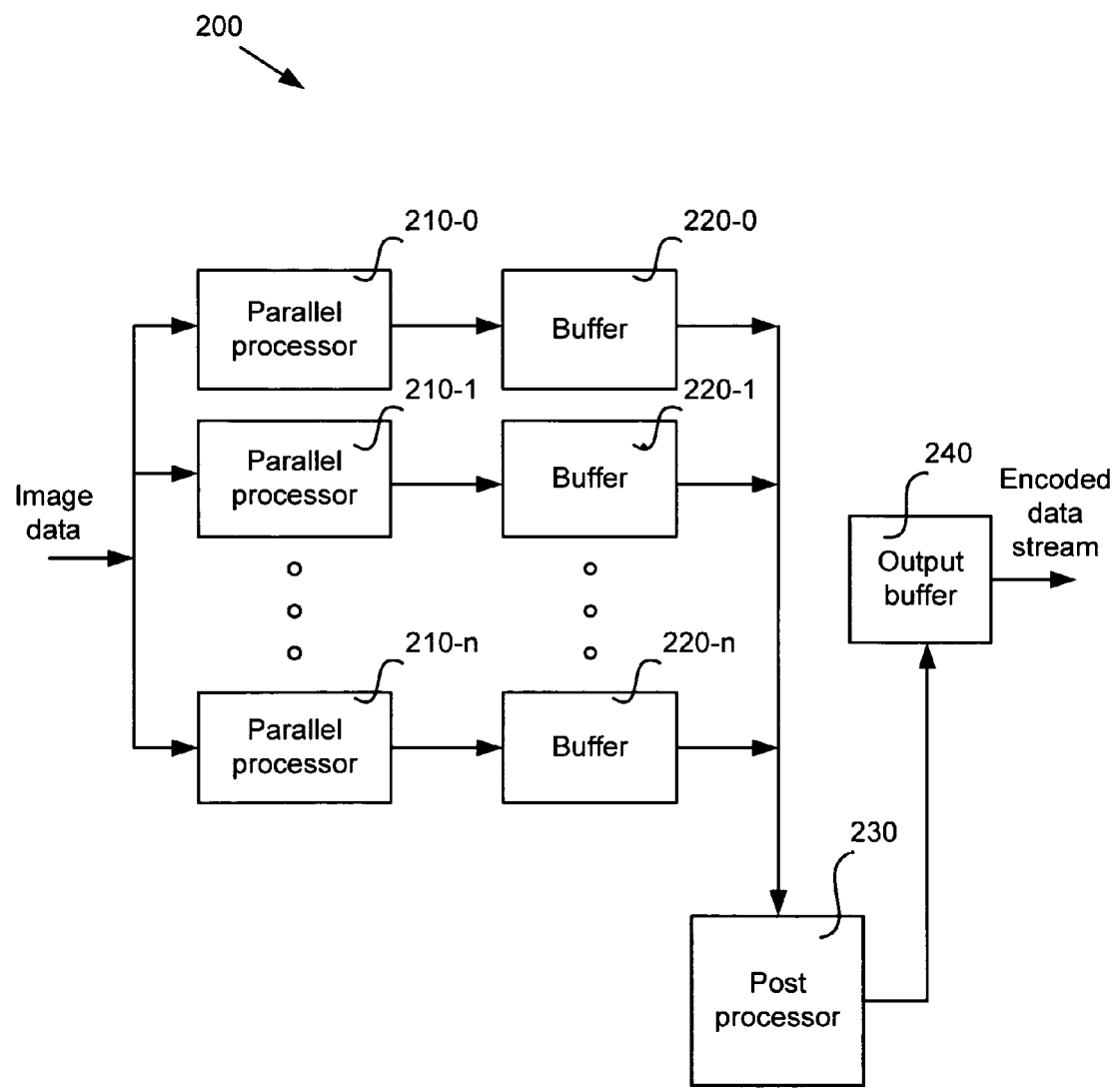
FIG. 2 illustrates an exemplary entropy encoder.

FIG. 2 illustrates an exemplary entropy encoder 200. Entropy encoder 200 may be a portion of a larger image and/or video encoder and may receive image information. In some implementations, entropy encoder 200 may receive chunks (e.g., blocks) of image information that have already been motion compensated, transformed (e.g., via discrete cosine transform (DCT), integer transform, etc.), and/or quantized. In some implementations, entropy encoder 200 may receive less processed (or unprocessed) image data and may perform one or more of these processes (e.g., quantization) itself. Entropy encoder 200 may output a compressed stream of bits that has been entropy encoded.

Entropy encoder 200 may include a number of parallel processors 210-0, 210-1, . . . , 210-n (collectively "parallel processors 210"), a number of associated buffers 220-0, 220-1, ..., 220-*n* (collectively "buffers 220), a post processor 230, and an output buffer 240. Parallel processors 210 may each independently entropy encode a chunk (e.g., block) of image or video information using assumed value(s) for those value(s) that are dependent on other chunks, and store the results in buffers 220. Post processor 230 may correct any data dependencies and assemble the compressed bit stream in output buffer 240.

Parallel processors 210 may each be configured to entropy encode a chunk (e.g., block or other grouping) image or video data. Although not explicitly illustrated, each of parallel processors 210 may include sufficient instruction memory to perform entropy encoding. Further, although not explicitly illustrated, in some implementations, processors 210 may include, or may be connected to, storage including one or more table(s) of entropy codes for use in the entropy coding operations.

Parallel processors 210 may include a suitable number of parallel processors to entropy encode a rather large chuck of image or video data in parallel (e.g., at roughly the same time). For example, in some implementations, there may be 4, 8, 16, 32, 64, or 128 processors 210 entropy encoding a like number of blocks of data in parallel. With reference to the last parallel processor 210-*n* in FIG. 1, n may equal 3, 7, 15, 31, or some other integer number. It should be noted that the total number of processors 210, (n+1), may be any integer, and is not limited to an integer power of 2.

Although not explicitly illustrated in FIG. 2 for simplicity of explanation, parallel processors 210 may be interconnected in some implementations, for example, in a matrix-type arrangement where one of parallel processors 210 may be connected to one, two, three, or more others of parallel processors 210. Also, though parallel processors 210 have been described as executing an entire entropy encoding task, in some implementations each of parallel processors 210 may execute an entropy encoding sub-task in conjunction with one or more of parallel processors 210. Other architectural and processing flow variations are both possible and contemplated for parallel processors 210 within the entropy encoding context described.

Buffers 220 each may include fixed-length storage for a stream of bits. Buffers 220 may be sized according to a longest expected stream of bits (e.g., 16 bits, 32 bits, 64 bits, 128 bits, etc.) that is produced when a corresponding parallel processor 210 entropy encodes a chunk (e.g., block) of data. Buffers 220 may include random access memory (RAM) or a first in first out (FIFO) memory arrangement to facilitate rapid transfer and storage of data. The particular configuration of buffers 220 may vary according to the design parameters of encoder 200.

In some implementations, buffers 220 may number as many as parallel processors 210. In implementations where more than one parallel processor 210 entropy encode a single chunk (e.g., block) of data, however, buffers 220 may number as many as the total number of chunksiblocks of data that are parallel-processed by processors 210.

Post processor 230 may be arranged to correct any data dependencies in the results in buffers 220 by replacing assumed values with correct dependent values and to assemble the resultant, compressed bit stream in output buffer 240. Post processor 230 may include sufficient instruction memory to perform such processing operations. Further details of the operation of post processor 230 will be provided with reference to FIGS. 3 and 4.

Output buffer 240 may include fixed-length storage for a stream of bits. Output buffer 240 may be sized according to a longest expected stream of bits that is produced when parallel processors 210-0 to 210-*n* entropy encode a number of chunks (e.g., blocks) of data. Although output buffer 240 may be as large as the size of one buffer 220 multiplied by n, in some implementations the size of output buffer 240 may be significantly smaller due to the expected compression of the data from buffers 220. Output buffer 240 may include random access memory (RAM) or a first in first out (FIFO) memory arrangement to facilitate rapid transfer and storage of data.

Figures 1A, 1B:
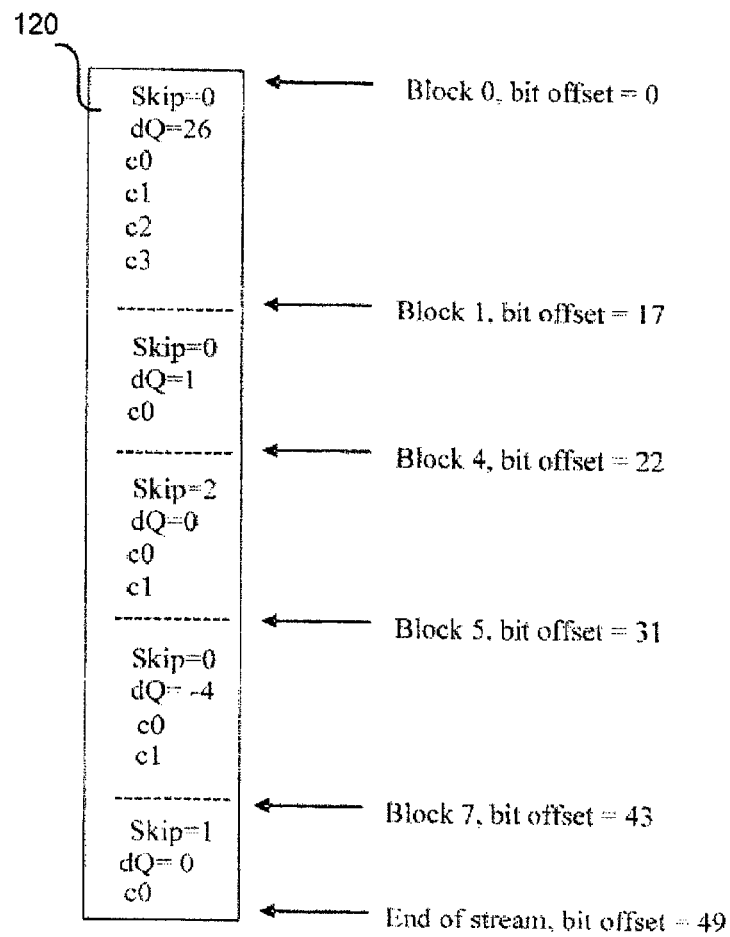

It should be noted that the total bit buffer size of buffers 220 and 240 needed is unchanged relative to the serial, single processor approach described with regard to FIGS. 1A and 1B, in implementations where buffer 240 uses the same memory space as buffers 220. This is because no additional data is being buffered. The buffering space in the serial, single processor approach has been reorganized from one, larger buffer for the image to many smaller per-block buffers 220 in FIG. 2. Also, buffer 240 may re-use memory space that was previously used for buffers 220, because post processor 230 is merely modifying and rearranging the data in buffers 220.

Although illustrated as being connected in a certain manner for ease of illustration, encoder 200 in FIG. 2 may be implemented in other configurations. For example, in some implementations, buffers 220 may be portions of a larger, single buffer, instead of separate elements as shown. In some implementations, the combination of buffers 220 and 240 may be replaced by a memory that is possibly accessed by a direct memory access (DMA) controller. Other variations are both possible and contemplated.

Figure 3:
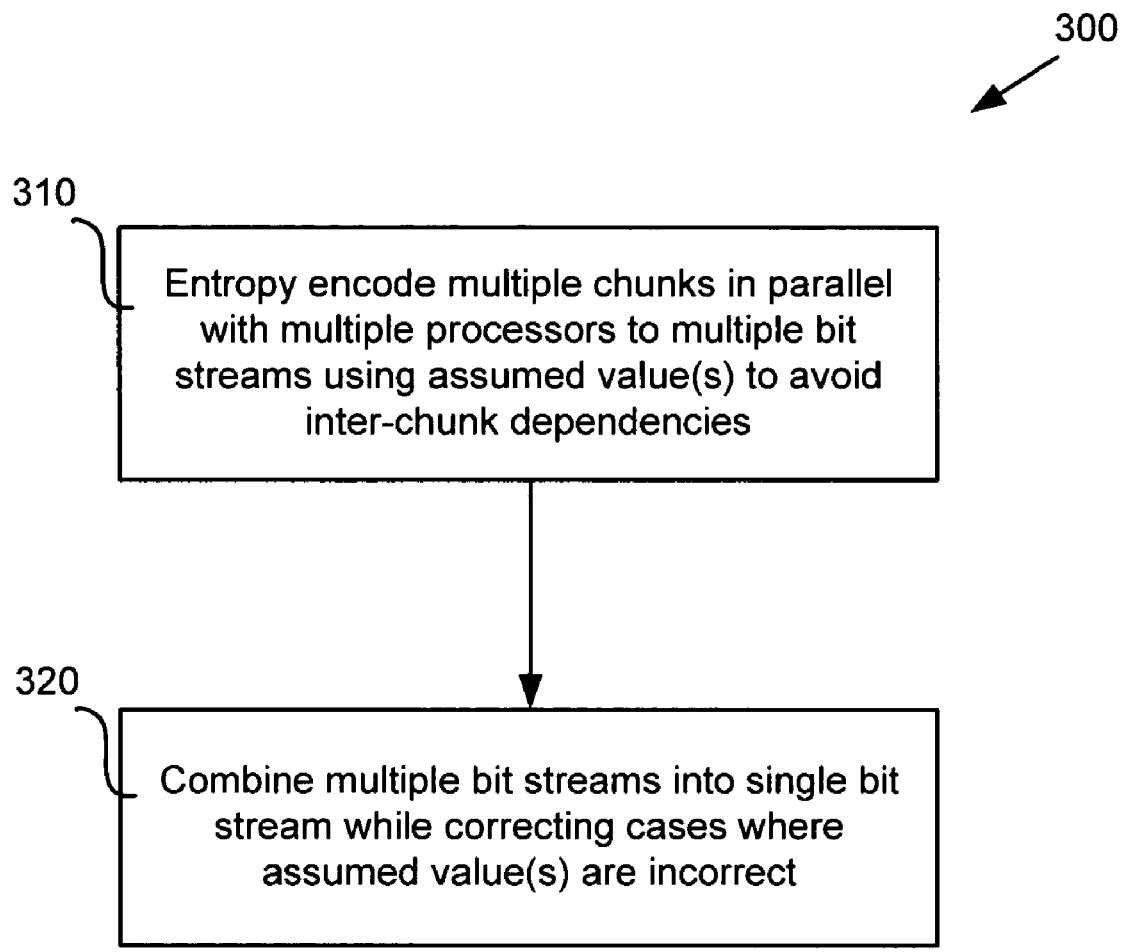
FIG. 3 illustrates an exemplary process of entropy encoding in parallel.

FIG. 3 illustrates an example process 300 of an exemplary process of entropy encoding substantially in parallel. Although FIG. 3 may be described with regard to encoder 200 in FIG. 2 for ease and clarity of explanation, it should be understood that process 300 may be performed by other hardware and/or software implementations.

Processing may begin by entropy encoding multiple chunks (e.g., blocks) of image or video data in parallel with parallel processors 210 to multiple bit streams in buffers 220 using assumed value(s) for any value(s) that are dependent on other chunks [act 310]. For example, each of processors 210-0 through 210-*n* may independently entropy encode a block of data without regard to other blocks and write a partial bit stream to a corresponding buffer 220-0 through 220-*n*. In some implementations, four, eight, sixteen, or more blocks of image data may be entropy encoded in act 310 at substantially the same time. It should be noted, however, that a larger or smaller number of chunks of data may be entropy encoded in act 310.

Also in act 310, processors 210-0 through 210-*n* may use certain assumed values for encoded information that would otherwise depend on other chunks of data than the one they are entropy encoding. For example, with reference to FIGS. 1A and 1B, fields for which processors 210 may use assumed values may include the "Skip" value (e.g., indicating the number of previous blocks that have no coefficients) and/or the dQ value (e.g., indicating the change in quantization value from that of the previous block) and/or a bit offset value (e.g., indicating at which point in the final bit stream each of the chunk-specific streams begins). Although Skip, dQ, and/or bit offsets may be specific examples of assumed values used in act 310, processors 210-0 through 210-*n* may use assumed values for any values and/or fields in encoded chunks or blocks that depend on other chunks and/or encoded values in other chunks of image or video data.

Processing may continue with post processor 230 combining multiple bit streams from buffers 220 into a single bit stream in output buffer 240 while correcting cases where assumed value(s) are incorrect [act 320]. For example, for chunks of data in buffers 220-1, 220-2, etc. (e.g., that might be dependent on earlier chunks), post processor 230 may adjust the assumed dQ values and/or Skip values to reflect any quantization differences from prior chunks and/or skipped chunks. Also, post processor 230 may keep track of the lengths of the partial streams in buffers 220 so that it may insert a partial stream at the correct offset position in output buffer 240. If the assumed values are correct (e.g., an assumed dQ value of 0 when the quantization value has not changed from the prior chunk), however, processor 230 may leave them unchanged in act 320.

Although Skip, dQ, and/or bit offsets may be specific examples of assumed values that are selectively corrected in act 320, post processor 230 may selectively correct (e.g., correct them if the assumed values turn out to be wrong) assumed values for any values and/or fields in encoded chunks or blocks that depend on other chunks and/or encoded values in other chunks of image or video data. In conclusion, parallel processors 210 may entropy encode chunks of data independently and in parallel (act 310), and post processor 230 may assemble a stream of bits upon correcting for any inter-chunk dependencies (act 320). Such parallel entropy encoding may, in effect, remove serial dependencies from a slower entropy encoding portion and shift such dependencies to a faster post-processing portion.

Figure 4:
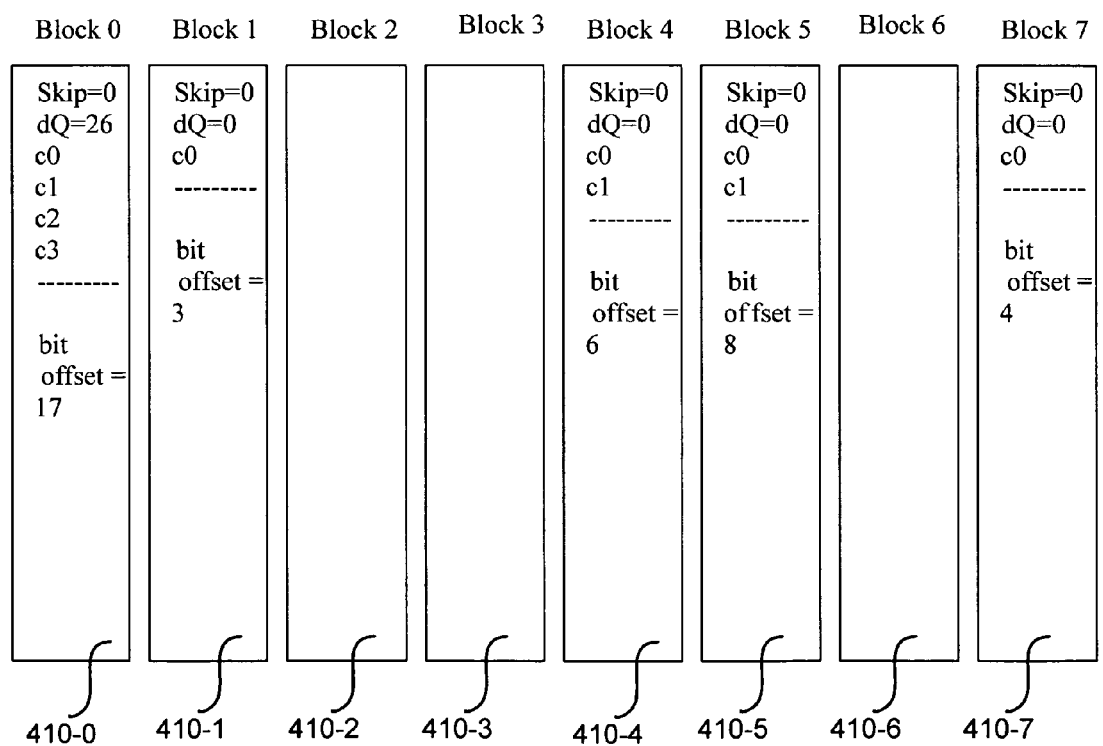
FIG. 4 conceptually illustrates parallel entropy encoding performed by multiple processors.

FIG. 4 conceptually illustrates one exemplary portion of parallel entropy encoding 300 performed by multiple processors 210. Although FIG. 4 may be described with regard to encoder 200 and process 300 for ease and clarity of explanation, it should be understood that the example illustrated in FIG. 4 is for explanatory purposes only and should not be construed to unduly limit the claimed invention. For comparison purposes, the numerical values in FIG. 4 may result in the same output bit stream 120 shown in FIG. 1B.

Bit streams 410-0 through 410-7 (collectively "bit streams 410") may be present in respective buffers 220-0 through 220-7 after the parallel encoding in act 310. The assumed values used in act 310 may be seen in bit streams 410, namely that the stream of bits for each chunk (e.g., block) starts at an offset of 0 and Skip and dQ are also 0 (except for bit stream 410-0 for the first block, which has no previous block dependency). Although not explicitly shown in FIG. 4, the actual quantization values, Q, for the blocks may also be stored (perhaps in buffers 220 after bit streams 410) so post processor 230 may determine the actual dQ values in act 320.

For this example, in act 320 post processor 230 may correct coded dQ for blocks 1 and 5. In so doing, processor 230 may replace the coded bits for dQ=0 (e.g., 1 bit in length for H.264) with the correct coded bits (e.g., for dQ values 1 and −4, respectively) and may insert any additional required bits for the changed dQ values into streams 410-1 and 410-5. For example, the bit offset for stream 410-1 may increase from 3 to 5 bits.

In act 320, post processor 230 also may correct the Skip values for blocks 4 and 7 to be 2 and 1, respectively, to reflect the lack of encoded coefficients for blocks 2, 3, and 6. In so doing, processor 230 may insert any additional required bits for the changed Skip values into streams 410-4 and 410-7. For example, the bit offset for stream 410-4 may increase from 6 to 9 bits.

Also in act 320, post processor 230 may copy corrected bit streams 410-1, 410-4, 410-5, and 410-7 to follow bit stream 410-0 in output buffer 240, including shifting streams as appropriate. For example, bit 0 of bit stream 410-1 may be shifted to stream bit position 17 in buffer 240 to follow the bits from stream 410-0. After act 320 is performed by post processor 230 on bit streams 410, a correctly encoded bit stream 120 may reside in output buffer 240.

Although the somewhat simplified example in FIG. 4 shows the bits for dQ immediately following the bits for Skip, in H.264 and/or other entropy encoding schemes this is not necessarily the case. There may be, for example, several variable length elements between Skip and dQ values, complicating the correction in act 320, because the bit offset to dQ may vary. One scheme to handle this variable length may be to separately save the dQ offset during act 310. Another scheme may be to variable length decode the elements following Skip until dQ is reached. As long as the processing performed in act 320 by post processor 230 takes less time than entropy encoding one or more blocks, however, process 300 may result in a net savings of entropy encoding time relative to the serial scheme discussed with regard to FIGS. 1A and 1B.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, in some implementations, the processing of blocks may be divided, with entropy coding a separate step that is not performed until all blocks have been processed. The block data in such a scheme may be stored to block-specific buffers. Because all of the data for all of the blocks is known when entropy coding starts, all blocks may be coded in parallel. It should be noted that in such a scheme somewhat large buffers may be needed for the uncompressed block data. Such buffers may be sized for the worst case, where all coefficients nonzero. Such a scheme may also need two loops across all blocks instead of one in the previously-described scheme.

Further, at least some of the acts in FIG. 3 may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method, comprising:
   entropy encoding, in parallel hardware processors, a plurality of chunks of data independently and at substantially the same time to generate a plurality of encoded results; and
   correcting, in a hardware post processor coupled to said parallel processors, for inter-chunk dependencies.

2. The method of claim 1, wherein the entropy encoding includes:
   inserting predetermined values in fields of the encoded results that depend on other encoded results.

3. The method of claim 2, wherein the fields of the encoded results include a differential quantization field or a skipped chunks field.

4. The method of claim 1, wherein the chunks of data include blocks of image data.

5. The method of claim 1, wherein processing includes:
selectively updating a differential quantization value or a skipped chunk value in an encoded result based on a previous encoded result.

6. A system, comprising:
a plurality of parallel processors, each of the plurality of parallel processors arranged to entropy encode a chunk of data independently of other chunks of data;
a plurality of buffers to store outputs of the plurality parallel processors; and
a post processor coupled to said parallel processors to correct for serial dependency among the outputs.

7. The system of claim 6, further comprising:
an output buffer connected to the post processor to store the output stream of bits.

8. The system of claim 6, wherein the plurality of parallel processors are not interconnected.

9. The system of claim 6, wherein the plurality of parallel processors includes at least four parallel processors.

10. The system of claim 6, wherein the plurality of buffers each have the same length.

11. A method, comprising:
entropy encoding a plurality of blocks independently and in parallel, in parallel hardware processors, to generate a plurality of bit streams, at least one of the plurality of bit streams including an assumed value in place of a value that would be determined by another bit stream;
selectively correcting the assumed value, in a hardware post processor coupled to said parallel hardware processors, based on a value in another one of the plurality of bit streams; and
combining, in said post processor, the plurality of bit streams into an output, entropy encoded bit stream corresponding to the plurality of blocks.

12. The method of claim 11, wherein the assumed value includes:
a skipped block value, a quantization value, or a bit offset value.

13. The method of claim 11, wherein the plurality of blocks includes at least eight blocks of image data or video data.

14. The method of claim 11, wherein the selectively correcting includes:
selectively correcting an assumed quantization value in one bit stream based on a quantization value in a prior bit stream.

15. The method of claim 11, wherein the selectively correcting includes:
selectively correcting an assumed skipped block value in one bit stream based on one or more prior bit streams.

16. A method, comprising:
entropy encoding a plurality of chunks of data in parallel, in parallel hardware processors, to produce a plurality of results, including:
using, in a hardware post processor coupled to said processors, predetermined values for any values in a result in the plurality of chunks of data that would otherwise depend on another result in the plurality of results.

17. The method of claim 16, wherein the entropy encoding includes Huffman-based coding, Golomb coding, arithmetic coding, or context-based arithmetic coding.

18. The method of claim 16, wherein the using predetermined values includes:
using predetermined values for differential quantization values in the plurality of results.

19. The method of claim 16, wherein the using predetermined values includes:
using predetermined values for skipped chunk values in the plurality of results.

20. The method of claim 16, further comprising:
selectively correcting the predetermined values based on the plurality of results and after the plurality of results are produced.

* * * * *